United States Patent
Zwack, III et al.

(10) Patent No.: US 9,925,908 B2
(45) Date of Patent: Mar. 27, 2018

(54) INFLATABLE MODULAR PANEL PROTECTION SYSTEM

(71) Applicants: Raymond Jacob Zwack, III, Woodbridge, VA (US); Stuart I Smith, Fairfax Station, VA (US)

(72) Inventors: Raymond Jacob Zwack, III, Woodbridge, VA (US); Stuart I Smith, Fairfax Station, VA (US)

( * ) Notice: Subject to any disclaimer, the term of this patent is extended or adjusted under 35 U.S.C. 154(b) by 0 days.

(21) Appl. No.: 15/373,124

(22) Filed: Dec. 8, 2016

(65) Prior Publication Data

US 2017/0159312 A1 Jun. 8, 2017

Related U.S. Application Data

(60) Provisional application No. 62/264,640, filed on Dec. 8, 2015.

(51) Int. Cl.
| | |
|---|---|
| *B60P 7/06* | (2006.01) |
| *E04H 6/42* | (2006.01) |
| *E04F 13/08* | (2006.01) |
| *E04F 13/18* | (2006.01) |
| *E04F 15/10* | (2006.01) |
| *E02B 3/26* | (2006.01) |

(52) U.S. Cl.
CPC ............ *B60P 7/065* (2013.01); *E04H 6/42* (2013.01); *E02B 3/26* (2013.01); *E04F 13/0894* (2013.01); *E04F 13/18* (2013.01); *E04F 15/105* (2013.01); *E04F 2290/044* (2013.01); *Y02A 30/36* (2018.01)

(58) Field of Classification Search
CPC ....... B60P 7/065; E06B 6/42; E04F 2290/044
USPC .................................................. 410/118, 119
See application file for complete search history.

(56) References Cited

U.S. PATENT DOCUMENTS

| | | | | |
|---|---|---|---|---|
| 2,028,060 A | * | 1/1936 | Eskell ................... | A01G 13/10 114/219 |
| 2,922,344 A | * | 1/1960 | Meissner ............... | E01C 9/083 114/261 |
| 4,013,018 A | * | 3/1977 | Hansen ................. | B60J 7/1256 105/377.02 |
| 6,112,478 A | * | 9/2000 | Piper ...................... | E04H 6/42 160/330 |
| 7,137,765 B1 | * | 11/2006 | Elze ....................... | B60P 7/065 410/119 |
| 2002/0136614 A1 | * | 9/2002 | Elze ....................... | B60P 7/065 410/119 |
| 2006/0263165 A1 | * | 11/2006 | Roloff .................... | B60P 7/065 410/119 |

(Continued)

*Primary Examiner* — Blair M Johnson (57) ABSTRACT

A modular inflatable protection system for protecting an item is provided. The system includes a plurality of inflatable modules, each of the modules having an inflatable body; a gas valve configured to receive a gas to inflate the inflatable body; a first connection portion; and a second connection portion. The first connection portion is configured to removably connect a first one of the modules to the second connection portion of a second one of the modules, the first connection portion can be reused to connect the first one of the modules to the second connection portion of a third one of the modules, and the system is configured to provide a barrier to protect the item from damaging contact by a potentially damaging element.

20 Claims, 5 Drawing Sheets

(56) References Cited

U.S. PATENT DOCUMENTS

2012/0216967 A1\* 8/2012 Johnson .................... E04H 6/42
          160/340
2017/0159312 A1\* 6/2017 Zwack, III ................ E04H 6/42

\* cited by examiner

INFLATABLE MODULAR PANEL PROTECTION SYSTEM

FIELD OF THE INVENTION

The invention is directed to an apparatus and method related to an inflatable modular panel system.

An example of an application for the invention is an inflatable modular panel system for use in a domestic garage to protect automobiles from potential damage.

BACKGROUND OF THE INVENTION

Many times a valuable item such as, for example, a car or motorcycle is subjected to damage while parked in a garage or otherwise stored. For example, a child can lose control of his skateboard while riding it in the garage, resulting in a dent in the side of his mother's valuable and otherwise pristine classic muscle car. Also, with today's average residential two-car garages being built smaller and smaller, it can be difficult to open the door of one car without having the door hit the other car.

Other situations exist where an item of value needs to be protected from some potentially damaging force. For example, a boat stored in a slip that is only slightly wider than the boat can result in damage to the boat from contact with the dock.

Applicants recognized this problem and developed a solution as described herein.

SUMMARY

The invention achieves the benefit of protecting an item by providing an inflatable barrier around the item or between the item and potentially damaging forces.

For example, a plurality of inflatable, connected, modules can provide a fixed or movable barrier wall along the side of a car parked in a garage.

Embodiments of the invention are based on the inventors' recognition that an inflatable barrier can provide simple and inexpensive protection from damaging forces such as car doors or airborne skateboards.

Several methods can be employed to provide the above described protection.

Particular embodiments of the invention are directed to a modular inflatable protection system for protecting an item. The system includes a plurality of inflatable modules, each of the modules having an inflatable body; a gas valve configured to receive a gas to inflate the inflatable body; a first connection portion; and a second connection portion. The first connection portion is configured to removably connect a first one of the modules to the second connection portion of a second one of the modules, the first connection portion can be reused to connect the first one of the modules to the second connection portion of a third one of the modules, and the system is configured to provide a barrier to protect the item from damaging contact by a potentially damaging element.

In some embodiments, each of the modules is identical in an inflated state.

In some embodiments, each of the modules has a height, a thickness, and a length, and the thickness of each of the modules is identical in an inflated state.

In some embodiments, the height of each of the modules is identical in the inflated state.

In some embodiments, the gas valve is configured to release the gas from the inflatable body to deflate the inflatable body.

In some embodiments, each of the modules further comprises a gas port configured to allow the gas to flow from the inflatable body of a first one of the modules to the inflatable body of a second one of the modules.

In some embodiments, a gas flow connector connects the gas port of the first one of the modules to the gas port of the second one of the modules such that the gas can flow between the first and second ones of the modules.

In some embodiments, the gas port is recessed into an end panel of the inflatable body.

In some embodiments, the end panel has a dimension equal to a thickness of the inflatable body.

In some embodiments, the first connection portion is a hook part of a hook and loop fastener and the second connection portion is a loop part of a hook and loop fastener.

In some embodiments, the first connection portion is located on a side panel of the module.

In some embodiments, a first connection flap extends beyond the inflatable body, and the first connection portion is located on the first connection flap.

In some embodiments, the first connection flap of the first one of the modules can attach to the second connection portion of the second one of the modules at a plurality of different locations.

In some embodiments, the first and second connections portions are configured such that the first one of the modules is attachable to the second one of the modules at an angle such that the first and second ones of the modules are not linearly aligned.

In some embodiments, a second connection flap extends beyond the inflatable body in a direction perpendicular to a direction in which the first extension flap extends from the inflatable body, and a third connection portion is located on the second connection flap.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the invention provide a solution to the problems associated with protecting a vehicle or other item from damage, especially in a garage or other storage situation.

Embodiments of the invention provide a system that includes a plurality of inflatable modules that can be assembled in various configurations.

Figure 1:
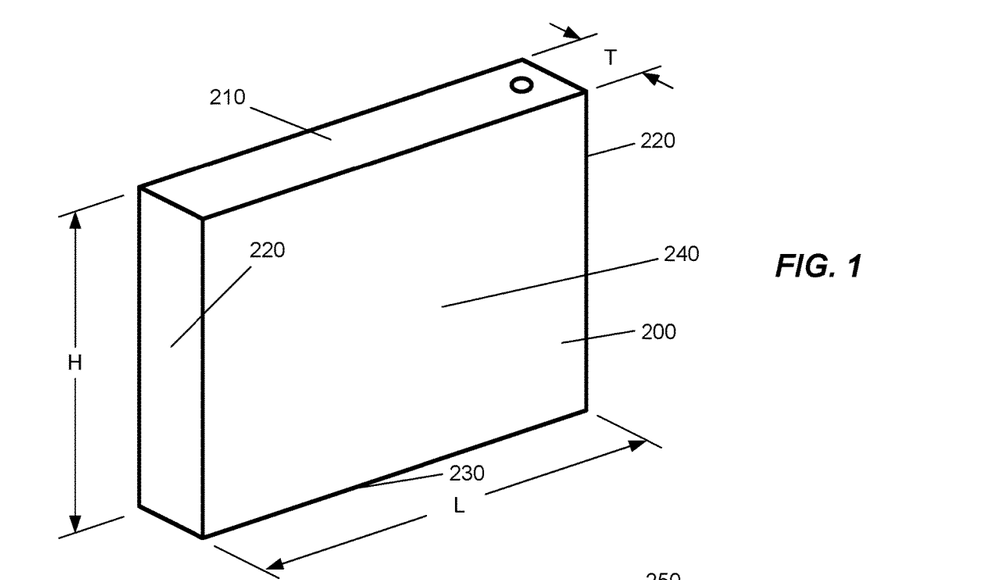
FIG. 1 is a perspective view of a module in accordance with exemplary embodiments of the invention.

FIG. 1 shows an example of a module 100 that is essentially a rectangular cuboid. In this example, module 100 has a top 210, two ends 220, a bottom 230, and two sides 240. And this example, module 100 has an inflatable body 200 that does not have a covering. In other examples, inflatable body 200 is covered by another material to provide additional protection to inflatable body 200 or to the item being protected. Ends 220 have a height H and a width equal to the thickness T of module 100. Top 210 as a length L and a width equal to the thickness T of module 100. Sides 240 have a length L and a height H. Bottom 230 has a length L and a width equal to the thickness T of module 100. Although the modules shown in the drawings may appear to be identical, modules of different dimensions can be used in a system. For example, modules may be produced in several standard heights, lengths, and thicknesses. Custom sizes can also be produced. Standard heights can include, but are not limited to, 30", 36" and 42". Standard lengths can include, but are not limited to, 24", 36" and 48". Standard thicknesses can include, but are not limited to, 2", 4" and 6". This shape is just one example of possible shapes of module 100. Module 100 can have a different shape such as, for example, cubical, spherical, conical or any other shape that is appropriate for the protection to be provided. The Figures show modules 100 with sharp corners. However, it is noted that modules 100 may have rounded corners due to, among other things, being inflated.

The example of FIG. 1 also has a gas valve 250 for inflation and deflation of inflatable body 200. Gas valve 250 can be a simple inflation port as is commonly used on inflatable rafts and toys, a one-way valve that requires additional user manipulation for deflation, a more sophisticated pressure limiting valve, or any other appropriate inflation/deflation valve. Since systems that use air or another temperature sensitive gases are subject to changes in pressure as a result of temperature changes, a pressure limiting valve can provide protection against over inflation due to rising temperatures. While this example shows gas valve 250 being for both inflation and deflation, other embodiments have one valve for inflation and a separate valve of for deflation.

FIG. 1 shows the basic structure of module 100 without any connection features. Various types of connection features can be used to secure a plurality of modules 100 to each other to form a protection system.

Figure 2:
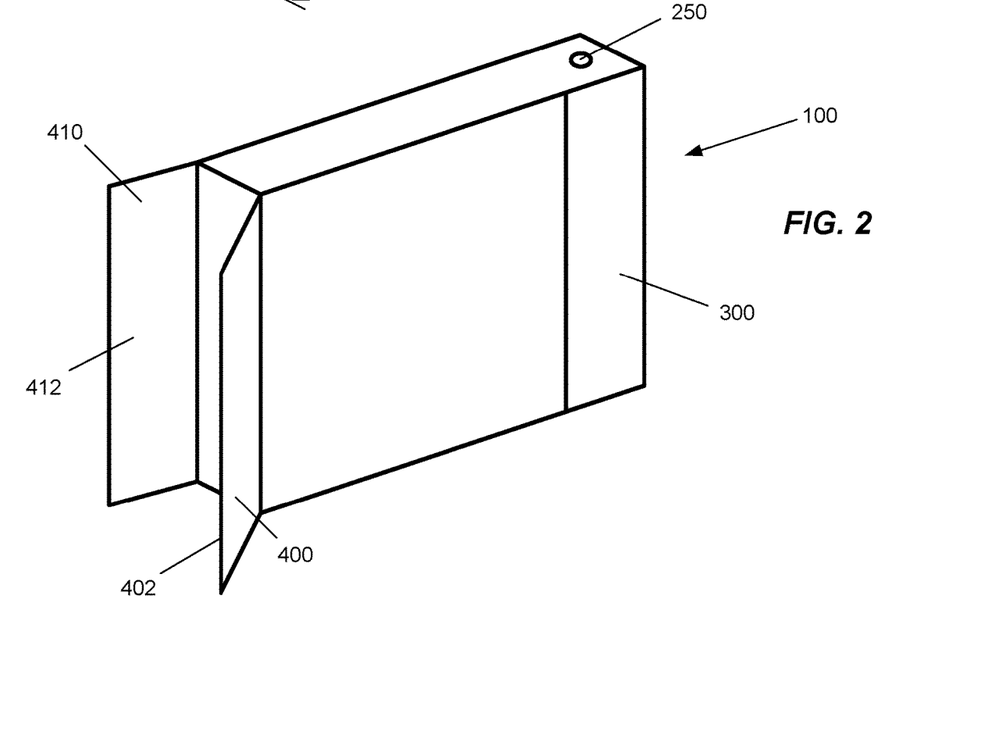
FIG. 2 is a perspective view of a module in accordance with exemplary embodiments of the invention.

FIG. 2 shows an example of module 100 at uses one or more connection flaps to secure it to a second module. In this example, module 100 has a connection flap 400 that has a connection portion located on an inner side of connection flap 400. Similarly, a connection flap 410 has a connection portion 412 located on an inner side of connection flap 410. In this example, module 100 also has a side connection portion 300 on each side 240 for receiving connection portions 402 and 412 of an adjacent module 100. The connection portions can use various methods of connection. For example, side connection portions 300 can be one part of a hook and loop fastener while connection portions 402, 412 are the other part of the hook and loop fastener. In other examples, electrostatic attraction or magnetic attraction can be used between side connection portions 300 and connection portions 402 and 412. In the case of magnetic attraction, magnets or a magnetic material can be embedded in side connection portions 300 and connection portions 402, 412. In addition to the examples given, any other appropriate connection system can be used. As discussed below, a connection system that permits two adjacent modules 100 to be connected in a variety of orientations and angles can be beneficial.

Figure 3:
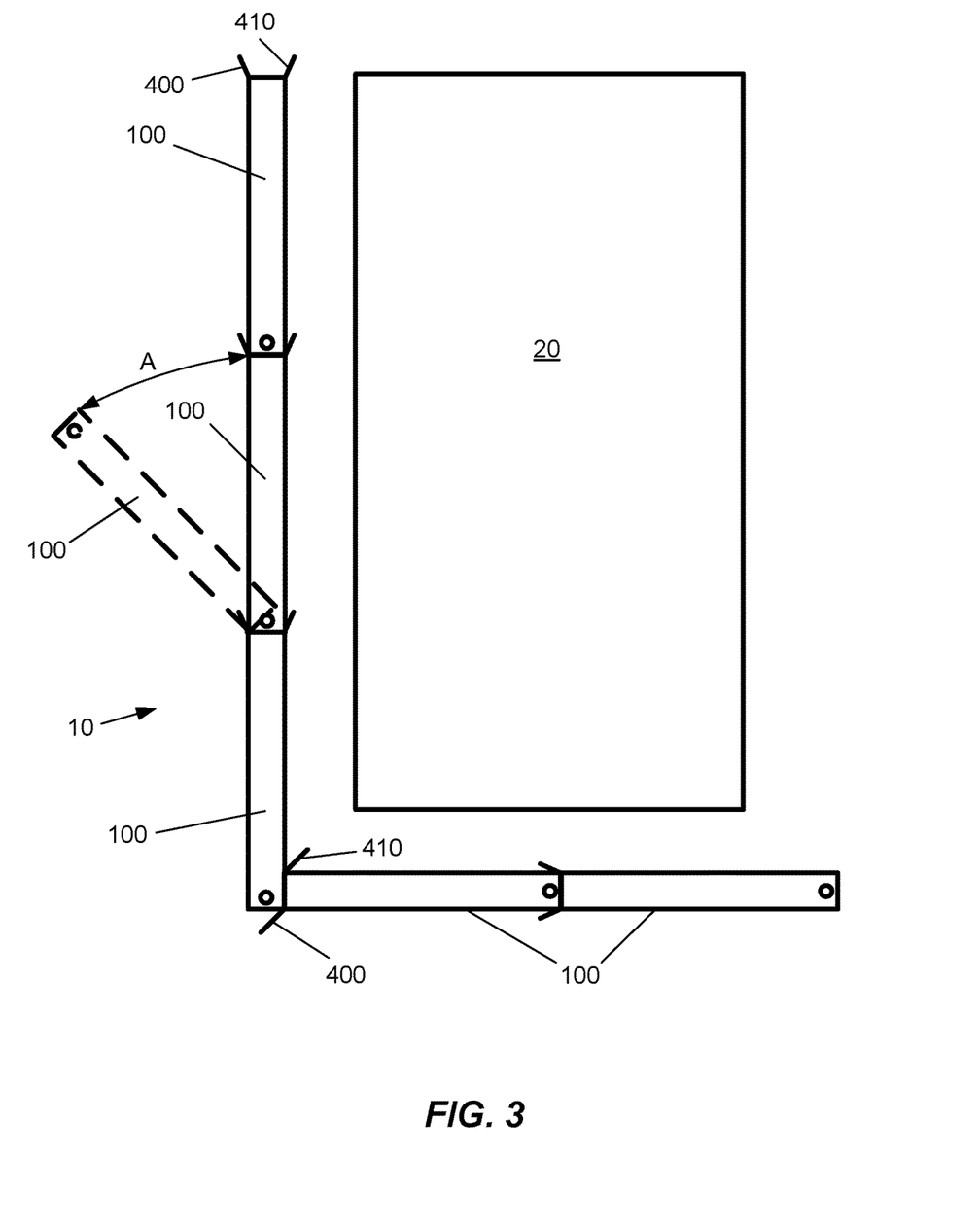
FIG. 3 is a top view of a system of modules in accordance with exemplary embodiments of the invention.

FIG. 3 shows an example of a system 10 using a plurality of modules 100 to protect an item 20, in this example a car in a garage. In this example, five modules 100 are connected in an L-shape to provide protection to the front and one side of the car. Such a system would be particularly appropriate with the normal situation of a car being parked in one side of a two-car garage and the owner of the car wanting to protect it from potential damage that can result from people moving things adjacent to the car. As can be seen in this figure, connection flaps 400, 410 are used to connect the modules 100 to each other. In the corner situation, connection flaps 400 and 410 are attached to an end connection portion and a side connection portion 300, respectively. This example also shows the additional feature of one of the modules 100 being able to rotate in an arc A (shown in broken lines) to allow the driver of the car to more easily enter and exit the car. The rotatable feature shown can result from simply disconnecting connection flaps 400, 410 or can result from the use of a less robust connection. For example, a less robust connection can result from using an additional piece of material that blocks a portion of connection portions 402, 412 so that only a remaining, unblocked, portion of connection portions 402, 412 contact side connection portions 300. While a particular configuration is shown in FIG. 3, it is noted that a wide variety of configurations are possible as a result of the modular characteristic of system 10. For example, a complete rectangle can be formed to completely surround item 20, or a line of modules 100 can be formed to protect just one side of item 20. In the case of a single line of modules 100, various methods of preventing the line of modules from falling over can be used. For example, one or more weighted bases either a part of the modules, attached to the modules or configured to receive the modules can be used, or one or more angled members can be used to prop up the modules. It is noted that in this Figure, and other Figures, connection flaps 400, 412 are shown separated from the adjacent modules 100 for illustrative purposes only. In practice, connection flaps 400, 412 would be pressed against the sides, or other surfaces, of the adjacent module.

Figure 4:
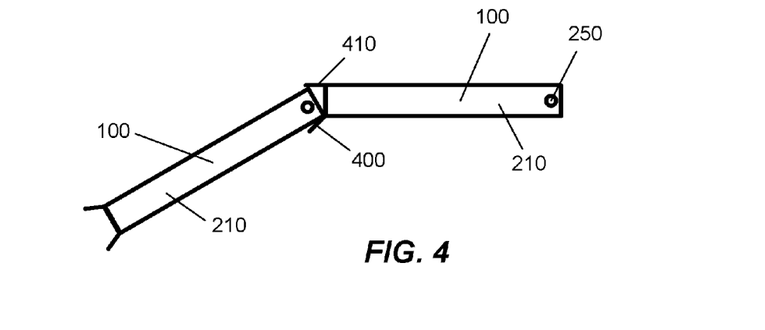
FIG. 4 is a top view of a connection of two modules in accordance with exemplary embodiments of the invention.

As mentioned above, in some embodiments connection flaps 400, 410 can be attached to side connection portions 300 (or other connection portions) in a variety of positions. FIG. 4 shows an example of two modules 100 connected at an angle. Such a configuration can be used in various situations. An example of such a situation is to create a more stable barrier when only a single line of modules is desired. Another example is to form a circle or other shape, closed or open, of modules.

Figure 5:
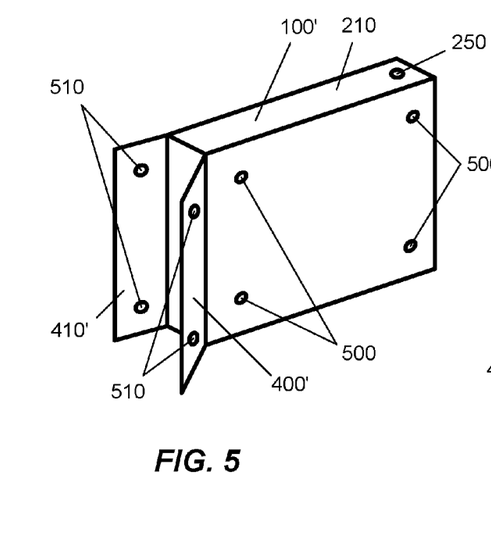
FIG. 5 is a perspective view of a module in accordance with exemplary embodiments of the invention.

FIG. 5 shows an example of another method of connection. Module 100' uses a plurality of snap connectors 500 on sides 240 and ends 220 that mate with snap connectors 510 located on connection flaps 400', 410'. In another embodiment, snap connectors 500, 510 can be replaced with magnets. With the incredible strength provided by modern neodymium magnets, a relatively small magnet can provide sufficient connection force to secure modules to one another.

Figure 6:
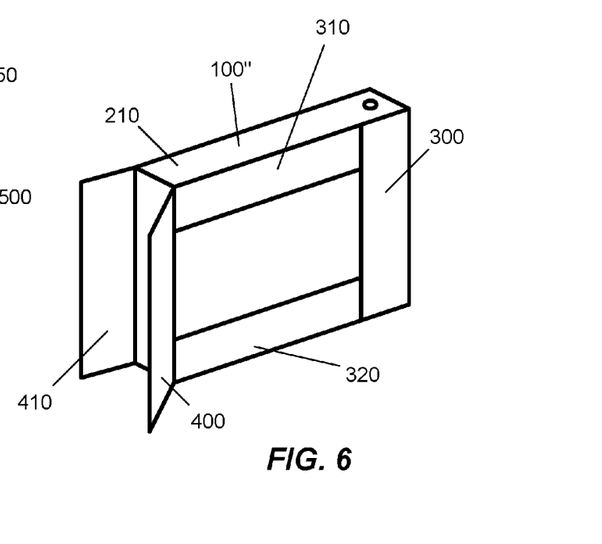
FIG. 6 is a perspective view of a module in accordance with exemplary embodiments of the invention.

FIG. 6 shows a module 100" that has, in addition to side connection portions 300 and connection flaps 400, 412, upper connection portions 310 and lower connection portions 320. Although not shown in this figure, an upper connection portion 310 and a lower connection portion 320 are provided on both sides 240. By providing upper connection portions 310 and lower connection portions 320, modules 100" can be connected vertically as well as horizontally to form walls that are taller than height H of a single module. An example of such a system is discussed below with reference to FIG. 11.

Figure 7:
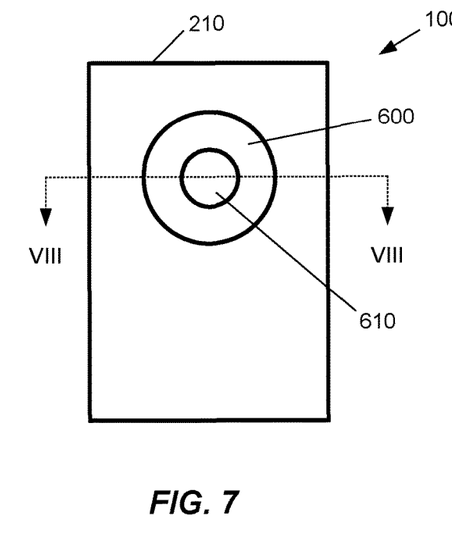
FIG. 7 is an end view of a module in accordance with exemplary embodiments of the invention.
Figure 8:
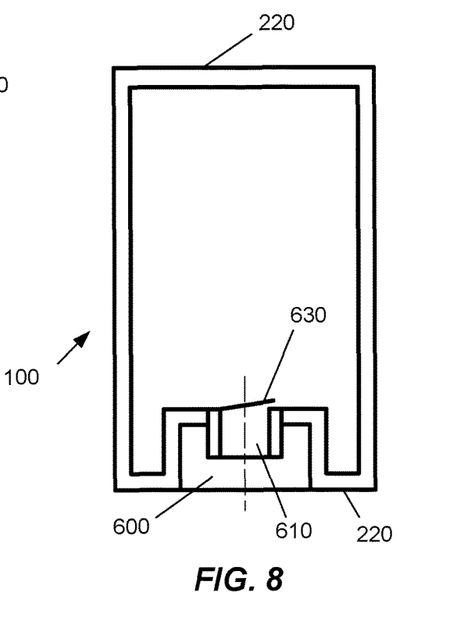
FIG. 8 is a sectional view of the embodiment shown in FIG. 7.

FIGS. 7 and 8 show an example of an embodiment that includes a gas port 610 located in a recess 600 in one or both ends 220. This provides a mechanism for fluidly connecting two adjacent modules 100 so that the gas can flow freely between the two modules. This configuration makes it possible to inflate or deflate an entire system of a plurality of connected modules by accessing only one gas valve 250. This can be particularly useful when it is desirable to repeatedly inflate and deflate the system, or when the configuration of the system blocks access to one more gas valves 250. In the example shown, gas port 610 is formed by a connector 620 which can be a different material than inflatable body 200, for example a hard plastic or other material. Connector 620 can be threaded connection, an interference connection, a bayonet connection, or other appropriate connection. Also shown in FIG. 8 is a valve 630 that prevents gas from exiting module 100 unless it is held open in some manner. Other configurations of valve 630 can be used as long as they prevent the gas inside module 100 from escaping when module 100 is not fluidly attached to another module. While these Figures show gas port 610 on only one end 220 of module 100, it is noted that some embodiments have a gas port 610 on each end 220, on top 210, and on bottom 230, or any combination of any number on any surface. Having multiple gas ports 610 facilitates inflating and deflating systems with many modules and/or with modules connected vertically. In addition, having gas ports, particularly multiple gas ports, allows inflation and deflation of systems (that would otherwise need to be disassembled to be inflated or deflated) without disassembling the modules. This can be particularly useful in applications that require repeated inflation and deflation for moving or some other reason.

Figure 9:
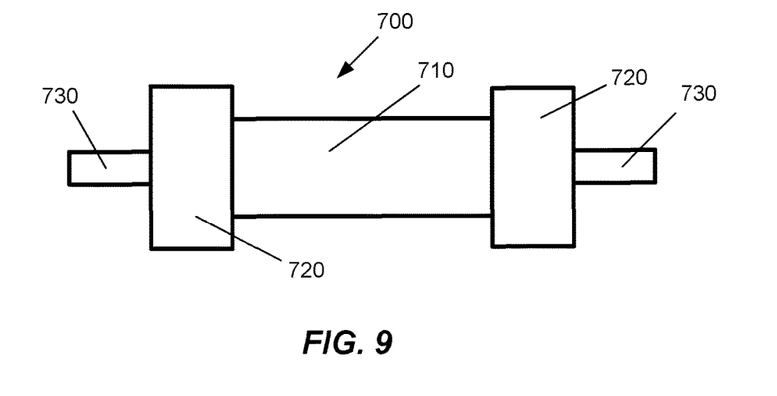
FIG. 9 is a side view of a gas flow connector in accordance with exemplary embodiments of the invention.

FIG. 9 shows an example of a gas flow connector 700 that can be used to fluidly connect two adjacent modules. Gas flow connector 700 has a central section 710 with a connector 720 and an insertion tube 730 on each end. When connector 720 is attached to connector 620, insertion tube 730 pushes valve 630 open and keeps it open as long as gas flow connector 700 is connected to module 100. By connecting both ends of gas flow connector 700 to two adjacent modules 100, the two modules will be fluidly connected so that the gas can freely flow between the two modules in both directions. If gas flow connector 700 uses threaded connections, right handed threads can be used on one end and left handed threads can be used on the other end so that installation on inflated modules is simplified. A thread adapter can be supplied to convert left handed threads to right handed threads and vice versa if it is needed for a particular application.

Figure 10:
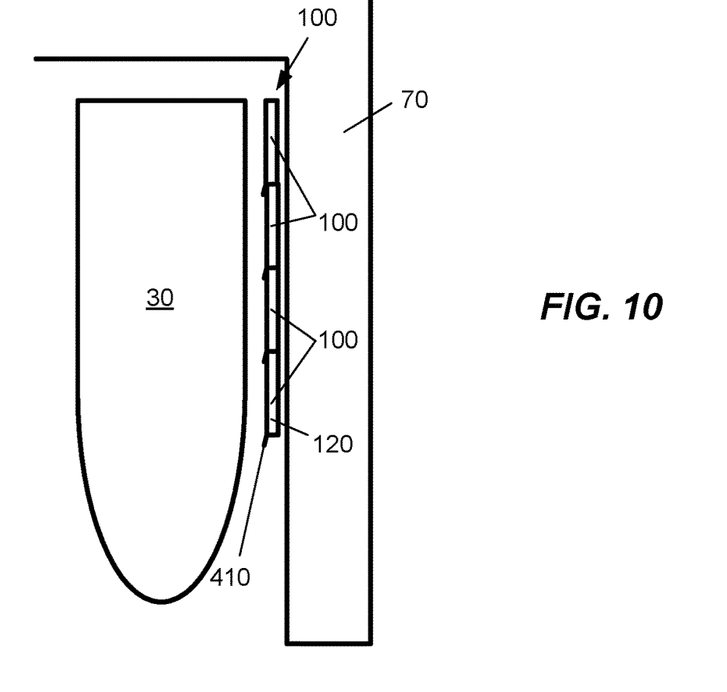
FIG. 10 is a top view of a system in accordance with exemplary embodiments of the invention.

FIG. 10 shows an example of a system 10 having a plurality of modules 100 that provide protection for a boat 30 tied to a dock 70. In this example, five modules 100 are connected to each other and placed between dock 70 and boat 30. System 10 can be tied to dock 70 so that system 10 does not move relative to dock 70, or system 10 can be hung from dock 70. Alternately, system 10 can be tied to, or hung from, boat 30. Although a linear configuration of system 10 is shown in this Figure, is noted that other configurations can also be formed. For example, an L-shaped configuration or a U-shaped configuration can be formed. Additionally, one or more modules 100 can be placed between two adjacent boats to prevent direct contact between the boats.

Figure 11:
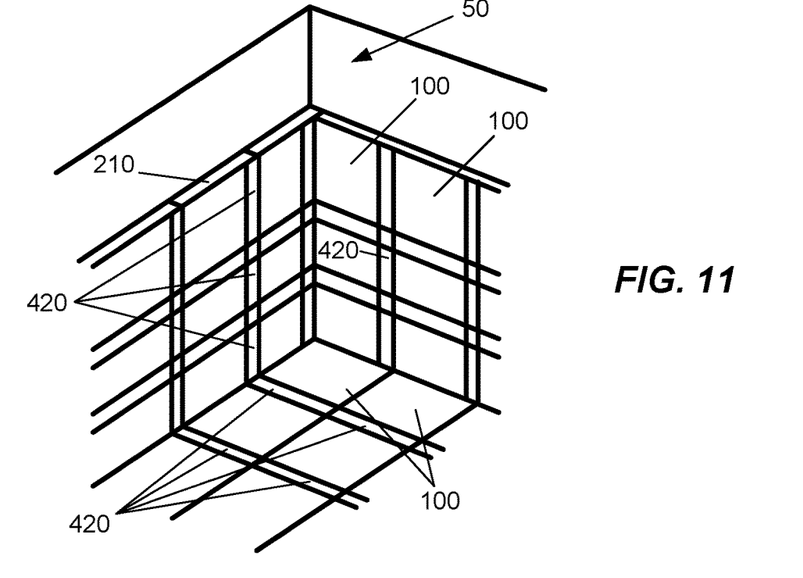
FIG. 11 is a perspective view of a system in accordance with exemplary embodiments of the invention.

FIG. 11 shows another example of a use for a system having a plurality of modules 100. In this example, a plurality of modules 100 are connected together to cover a floor and the walls of a room 50. Although only two walls are shown in this example, one wall or all of the walls can be covered. Using such a system, any room can be turned into a "bounce-house" for a child's party or the like. Depending on the application, the modules used to cover the floor may be thicker and or stronger to withstand the force of people walking or bouncing on them. It is noted that there are other applications for such a system, for example protecting walls and/or floors during furniture moving or other potentially damaging activities.

Other embodiments of the invention include a modular recreational floating system or island for use in a pool, lake, or river; a modular freight protection system that can be inflated in place to protect goods in transit on, for example, moving trucks, trains, and airplanes; a modular warehouse goods protection system that can help limit damage to goods in a warehouse or store; a modular moving service protection system that can help avoid damage to walls as furniture is moved in and around houses, offices, etc.; a modular vehicle protection system for auto service centers to help avoid damage to vehicles in the repair shop; and a modular vehicle protection system that can be positioned over a vehicle to avoid hail or tree limb damage.

As can be seen in the above exemplary embodiments, the invention provides solutions to the problems associated with protecting items from damage.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A modular inflatable protection system for protecting an item, the system comprising:
 a plurality of inflatable modules, each of the modules having
  a first side, a second side opposite the first side, and an end located adjacent to the first side and adjacent to the second side;
  an inflatable body;

a gas valve configured to receive a gas to inflate the inflatable body;

a first connection portion, the first connection portion comprising a first flap that extends beyond the inflatable body; and a second connection portion, the second connection portion comprising a first section located on the first side of the module, wherein the first connection portion is configured to removably connect a first one of the modules to the second connection portion of a second one of the modules, the first connection portion can be reused to connect the first one of the modules to the second connection portion of a third one of the modules, the system is configured to provide a barrier to protect the item from damaging contact by a potentially damaging element, and the end is located between the first side and the second side.

2. The system of claim 1, wherein each of the modules is identical in an inflated state.

3. The system of claim 1, wherein each of the modules has a height, a thickness, and a length, and
the thickness of each of the modules is identical in an inflated state.

4. The system of claim 3, wherein the height of each of the modules is identical in the inflated state.

5. The system of claim 1, wherein each of the modules has a height, a thickness, and a length, and
the height of each of the modules is identical in an inflated state.

6. The system of claim 1, wherein the gas valve is configured to release the gas from the inflatable body to deflate the inflatable body.

7. The system of claim 1, wherein each of the modules further comprises a gas port configured to allow the gas to flow from the inflatable body of a first one of the modules to the inflatable body of a second one of the modules.

8. The system of claim 7, further comprising a gas flow connector that connects the gas port of the first one of the modules to the gas port of the second one of the modules such that the gas can flow between the first and second ones of the modules.

9. The system of claim 1, wherein one of the first connection portion and the second connection portion is a hook part of a hook and loop fastener and the other of the first connection portion and the second connection portion is a loop part of a hook and loop fastener.

10. The system of claim 1, wherein the first connection portion of the first one of the modules can attach to the second connection portion of the second one of the modules at a plurality of different locations.

11. The system of claim 10, wherein the first and second connections portions are configured such that the first one of the modules is attachable to the second one of the modules at an angle such that the first and second ones of the modules are not linearly aligned.

12. The system of claim 11, wherein one of the first connection portion and the second connection portion is a hook part of a hook and loop fastener and the other of the first connection portion and the second connection portion is a loop part of a hook and loop fastener.

13. The system of claim 1, wherein the first and second connections portions are configured such that the first one of the modules is attachable to the second one of the modules at an angle such that the first and second ones of the modules are not linearly aligned.

14. The system of claim 1, wherein the first connection portion further comprises a second flap that extends beyond the inflatable body in a direction parallel to a direction in which the first flap extends beyond the inflatable body, and
the second connection portion further comprises a second section located on the second side of the module.

15. The system of claim 14, wherein the inflatable body has a longitudinal direction and a lateral direction perpendicular to the longitudinal direction, the inflatable body is longer in the longitudinal direction than it is in the lateral direction, the first and second flaps extend in the longitudinal direction, and when the first and second flaps are connected to the first and second sections of the second connection portion, the first and second flaps are located outside of the inflatable body in the lateral direction.

16. A modular inflatable protection system for protecting an item, the system comprising:

a plurality of inflatable modules, each of the modules having
a first side, a second side opposite the first side, and an end located adjacent to the first side and adjacent to the second side;
an inflatable body;
a gas valve configured to receive a gas to inflate the inflatable body;
a first connection portion, the first connection portion comprising a first flap that extends beyond the inflatable body; and
a second connection portion; and a blocking device that is configured to attach to the first connection portion or the second connection portion to at least partially block a connection between the first connection portion and the second connection portion in order to create a partial connection between the first connection portion and the second connection portion that is weaker than a full connection between the first connection portion and the second connection portion, wherein the first connection portion is configured to removably connect a first one of the modules to the second connection portion of a second one of the modules, the first connection portion can be reused to connect the first one of the modules to the second connection portion of a third one of the modules, the system is configured to provide a barrier to protect the item from damaging contact by a potentially damaging element, and the end is located between the first side and the second side.

17. The system of claim 16, wherein the second connection portion comprising a first section located on the first side of the module.

18. The system of claim 17, wherein the first connection portion further comprises a second flap that extends beyond the inflatable body in a direction parallel to a direction in which the first flap extends beyond the inflatable body, and
the second connection portion further comprises a second section located on the second side of the module.

19. The system of claim 18, wherein the inflatable body has a longitudinal direction and a lateral direction perpendicular to the longitudinal direction, the inflatable body is longer in the longitudinal direction than it is in the lateral direction, the first and second flaps extend in the longitudinal direction, and when the first and second flaps are connected to the first and second sections of the second connection portion, the first and second flaps are located outside of the inflatable body in the lateral direction.

20. The system of claim 16, wherein the first connection portion of the first one of the modules can attach to the second connection portion of the second one of the modules at a plurality of different locations.

* * * * *